L. E. HAWKINS.

Wheel-Cultivator.

No. 29,592. Patented Aug. 14. 1860.

Witnesses:
J. W. Coombs
R. S. Spencer

Inventor:
L. E. Hawkins
per Munn & Co
Attorneys

UNITED STATES PATENT OFFICE.

LYMAN E. HAWKINS, OF SANGAMON, ILLINOIS.

IMPROVEMENT IN CULTIVATORS.

Specification forming part of Letters Patent No. 29,592, dated August 14, 1860.

*To all whom it may concern:*

Be it known that I, LYMAN E. HAWKINS, of Sangamon, in the county of Macon and State of Illinois, have invented a new and useful Improved Corn-Cultivator; and I do hereby declare that the following is a full, clear, and exact description thereof, reference being had to the accompanying drawings, forming a part of this specification, in which—

Figure 1:
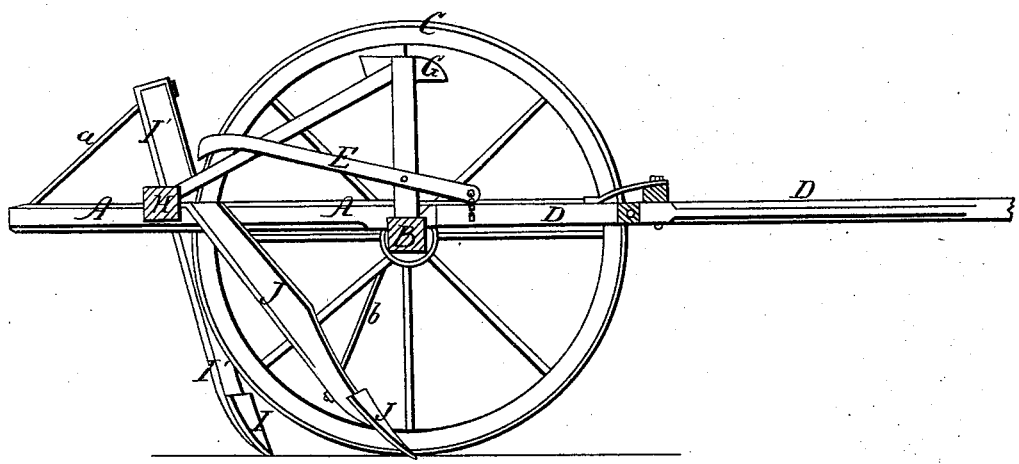
Figure 2:
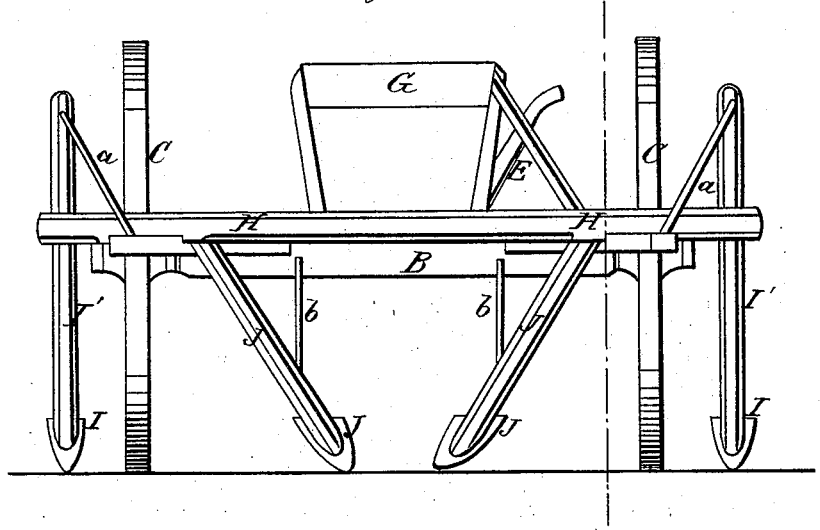

Figure 1 represents a side sectional elevation of the cultivator with one wheel removed. Fig. 2 shows a rear view of the machine.

Similar letters of reference indicate corresponding parts in both figures.

To enable those skilled in the art to fully understand my invention, I will proceed to describe its construction and operation.

In the drawings, A represents a triangular frame that is bolted to the top of axle-tree B and extends back in rear of the wheels C C, in which the frame is mounted.

D is the draft-pole that is attached between the ends of the frame-timbers, as shown in the drawings, and has a triangular enlargement formed on the rear end, that stiffens the pole and prevents it from having a lateral play in the frame A. The bolt that passes transversely through the frame and draft-pole allows the pole to play up and down, and, by attaching a hand-lever, E, to the rear end of the draft-pole, with its fulcrum on one leg of the driver's seat G, the driver will be enabled to raise or depress the rear end of frame A at pleasure.

H is a timber that extends transversely across the frame A, and is secured to it just in rear of the wheels C C. To the extreme ends of this bar H, which ends project some distance out beyond the sides of the wheels, are attached two shovels, I I, the standards I' of which are braced by rods $a\ a$, that connect with the rear ends of the frame A. Then on the inside of the frame A are placed two more shovels, J J, the standards of which are inclined forward and toward the middle of the machine, as represented. The standards are braced by rods $b\ b$, that connect with the axle-tree of wheels C C.

In using this machine the wheels run in the furrows on each side of a row of plants, which row is cultivated by the two converging shovels J J. The shovels I I at the same time loosen the earth on one side of each adjacent row. Then in returning the machine over the field again these unfinished rows will be completely cultivated. The machine is thus passed over every other row, and the work can in this manner be accomplished with a light machine in one-half the time required to cultivate each row separately.

The driver by means of the hand-lever can adjust the shovels at any depth he wishes them to run, depending upon the size of the plants, the state of the soil, and various other circumstances.

Having thus described my invention, what I claim as new, and desire to secure by Letters Patent, is—

The arrangement of the oblique stocks J', plows J, vertically-inclined stocks I', plows I, rods $a\ b$, frame A, axle-tree B, wheels C C, pole D, lever E, and seat G, as and for the purpose herein shown and described.

LYMAN E. HAWKINS.

Witnesses:
WASHINGTON HAWKINS,
JOHN GROSS.